(12) United States Patent
Svensson et al.

(10) Patent No.: US 7,945,349 B2
(45) Date of Patent: May 17, 2011

(54) METHOD AND A SYSTEM FOR FACILITATING CALIBRATION OF AN OFF-LINE PROGRAMMED ROBOT CELL (75) Inventors: Tommy Y. Svensson, Denver, CO (US); Magnus K. Gustafsson, Träslövsläge (SE); Mathias Haage, Lund (SE)

(73) Assignee: ABB Technology AB, Västerås (SE)

( * ) Notice: Subject to any disclaimer, the term of this patent is extended or adjusted under 35 U.S.C. 154(b) by 0 days.

(21) Appl. No.: 12/311,039

(22) PCT Filed: Jun. 9, 2008

(86) PCT No.: PCT/EP2008/057139
§ 371 (c)(1),
(2), (4) Date: Jun. 23, 2010

(87) PCT Pub. No.: WO2009/149740
PCT Pub. Date: Dec. 17, 2009

(65) Prior Publication Data
US 2010/0262288 A1  Oct. 14, 2010

(51) Int. Cl.
*G05B 19/04* (2006.01)
(52) U.S. Cl. ............... 700/254; 700/264; 901/2; 901/3; 901/4; 901/5; 901/6
(58) Field of Classification Search .......... 700/254, 700/264; 901/2–6
See application file for complete search history.

(56) References Cited

U.S. PATENT DOCUMENTS

| | | |
|---|---|---|
| 5,937,143 A | 8/1999 | Watanabe et al. |
| 2004/0172168 A1 | 9/2004 | Watanabe et al. |
| 2005/0049749 A1 | 3/2005 | Watanabe et al. |

FOREIGN PATENT DOCUMENTS

| | | |
|---|---|---|
| EP | 0792726 | 9/1997 |
| EP | 1462224 | 9/2004 |
| EP | 1510894 | 3/2005 |
| EP | 1842631 | 10/2007 |

*Primary Examiner* — Khoi Tran
*Assistant Examiner* — Jerrah Edwards
(74) *Attorney, Agent, or Firm* — Dilworth & Barrese, LLP.

(57) ABSTRACT

The present invention relates to a method and a system for facilitating calibration of a robot cell including one or more objects (8) and an industrial robot (1,2,3) performing work in connection to the objects, wherein the robot cell is programmed by means of an off-line programming tool including a graphical component for generating 2D or 3D graphics based on graphical models of the objects. The system comprises a computer unit (10) located at the off-line programming site and configured to store a sequence of calibration points for each of the objects, and to generate a sequence of images (4) including graphical representations of the objects to be calibrated and the calibration points in relation to the objects, and to transfer the images to the robot, and that the robot is configured to display said sequence of images to a robot operator during calibration of the robot cell so that for each calibration point a view including the present calibration point and the object to be calibrated is displayed to the robot operator.

20 Claims, 4 Drawing Sheets

Fig. 5c

METHOD AND A SYSTEM FOR FACILITATING CALIBRATION OF AN OFF-LINE PROGRAMMED ROBOT CELL

BACKGROUND OF THE INVENTION

1. Field of the Invention

The present invention relates to a method and a system for facilitating calibration of a robot cell including one or more objects and an industrial robot performing work in connection to the objects, wherein the robot cell is programmed by means of an off-line programming tool.

The invention relates to the area of off-line to on-line programming, when a user has programmed or adjusted a robot program in a 3D or 2D off-line environment and then wishes to take that program to the factory floor.

2. Prior Art

Industrial robots are highly flexible devices used for a wide variety of operations in many different industrial applications. Industrial robots are conventionally programmed via a robot programming language that is very similar to conventional computer programming languages. A robot program includes a sequence of program instructions where each instruction tells the robot control unit what to do and how to do it. Robots are programmed to follow a path including a plurality of target points. The robot program includes the positions of the target points. The programming of robots is a time consuming process and the conventional methods of using the robot during the programming and teaching process ties up the production equipment and delays production start. In order to save time and speed production start, it is highly desirable to program a robot off-line. Conventionally, this is done through a graphical simulation by an off-line programming tool. The programming tool contains a graphical component for generating a graphical 3D representation of the robot and objects in the robot cell, such as work objects and tools, based on graphical models, for example CAD models, of the robot and the objects. The programming tool further contains a graphical means for teaching target points and paths and recording the operations and movements of the robot. The graphical simulation provides a much more natural and easy method for programming and visualizing an industrial robot, without tying down the actual equipment. In addition, the graphical environment allows an independence from the robot programming language used by the robot manufacturer. The output from the simulation is a graphical representation of what the robot should do during operation and the real robot program. When the simulation and off-line programming is completed, the program can be transferred to the real robot.

However, a robot program prepared by an off-line programming system cannot directly be used for operating a robot in a real robot cell, because the positional relationship between the robot and the objects in the off-line environment may deviate from the actual positional relationship between the robot and the objects in the real robot cell. This is traditionally a very difficult problem and has been a hindrance to the adoption of off-line programming in industry.

Accordingly, after generating a robot program based on graphical models of the objects, the positions of the real objects relative the robot must be determined. An object can be any type of object in the robot cell, such as a work piece, a work station, a tool, robot base frame, or external equipment. Usually the actual target positions in the programmed path are related to a reference frame defined in relation to the object, which means that calibrating an object will adjust the related target positions in relation to the common coordinate system.

Calibration of a robot cell includes determining the positions of the robot and the objects in the robot cell in relation to a common coordinate system. This is typically done by using the robot as a measuring device. The user jogs the robot to at least three calibration points on the object and the robot positions are recorded for the calibration points. With the term "jogging the robot" is meant that the robot is manually moved by the user, for example by means of a joy stick. The recorded robot positions are then used to determine the relation between the robot and the real objects. Since the relations between the robot and the models of the objects are known, it is possible to determine the relations between the models and the real positions of the object. The real position of the object can then be updated and therefore all the position on the programmed path will be updated since the relation between the position on the programmed path and the object is kept.

A person controlling a robot is denoted a robot operator. In the following the words user and robot operator are used synonymously. When there are many objects to be calibrated, the user has to jog the robot to all of the objects and accordingly to many calibration points on the objects. Further, the order in which the robot visits the calibration points is important for the calibration result. Typically, the user must write down on a piece of paper all of the objects to be calibrated, and the positions of the calibration points. This takes time and is error prone.

After the calibration, there can still be deviations between the models and the real objects in the cell. Before applying the robot program into the production, the robot program has to be checked and corrected, for example to avoid collisions. This means that the off-line generated robot program has to be run on the robot. EP1510894 discloses an apparatus for correcting off-line generated robot programs. The apparatus includes means for stopping execution of the robot program when receiving a stop command, means for displaying the next target point which position is to be corrected on a display screen upon stopping the execution, means for moving the robot by jogging from the position where the execution of the program has been stopped, and means for reflecting the current position of the robot on the next target point of which position is to be corrected, when the position of the target point is corrected. The correction procedure has to be repeated for each target point on the programmed path, which is time consuming.

OBJECTS AND SUMMARY OF THE INVENTION

The object of the present invention is to provide a tool for the robot operator that facilitates the calibration of the objects in a robot cell.

According to one aspect of the invention, this object is achieved by the method as defined herein.

Such a method comprises: storing a sequence of calibration points for each of the objects, automatically generating a sequence of images including graphical representations of the objects to be calibrated and the calibration points in relation to the objects, transferring the sequence of images to the robot, and displaying said sequence of images to a robot operator during calibration of the robot cell so that for each calibration point a view including the present calibration point and the object to be calibrated is displayed to the robot operator.

For each object a set of predetermined calibration points and information on a desired order in which the calibration points should be visited during calibration is stored in the off-line environment. According to the invention, a plurality of images including graphical representations of the objects to be calibrated and the calibration points in relation to the objects are generated. The images are virtual images including graphical objects. The sequence of the images shows the order in which the calibration points are to be visited by the robot. Those images are transferred to the robot and are displayed to the user during the calibration. The calibration points are preferably chosen such that their positions can easily be identified from the image, for example at corners of the object, or at a protruding part, such as a tip. The images facilitates for the robot operator to move the robot to the calibration points.

The invention provides a system and a method to help the robot operator take an off-line programmed robot program to a robot cell on a factory floor and calibrate the objects in the robot cell. The invention speeds up the calibration process and reduces the risk of mistakes in connection with the calibration, such that the operator moves the robot to wrong calibration point.

According to an embodiment of the invention, the images are generated by loading real images from a library of images.

According to another embodiment of the invention, the same graphical component as used for programming the robot is used for generating the images. The images are, for example, screen shots (or snap shots) from the simulation of the robot cell carried out during the programming. This embodiment makes it easy to produce the images.

According to an embodiment of the invention, the sequence of calibration points is stored together with the graphical model of the object. The off-line programming tool includes a plurality of graphical models of object. According to this embodiment of the invention, each of the graphical models is provided with a predefined sequence of calibration points. The programmer builds a virtual robot cell by selecting one or more of the object models and adding them to the cell. Thus, which calibration points to be used depends on which objects the programmer selects. This embodiment makes it easy to provide calibration points to be used during the calibration.

According to an embodiment of the invention, the method comprises: automatically generating at least one calibration program including instructions for moving the robot to positions at or close to the calibration points, based on said stored sequence of calibration points, transferring the calibration program and the images to the robot, and executing said calibration program so that for each calibration point the robot is automatically moved to a position at or close to the calibration point. A calibration program including instructions for moving the robot to positions at or close to the calibration points is automatically generated at the off-line environment. The calibration program is transferred to the robot and is used during the calibration to quickly move the robot to, or close to the calibration points. Although the robot is programmed to be moved to a calibration point, in practice the robot will not be move exactly to the calibration point due to the fact that the positional relationship between the robot and the objects in the off-line environment deviates from the actual positional relationship between the robot and the objects. Therefore, the robot operator must manually move the robot to the exact calibration point on the object. The images displayed to the user during the calibration facilitates for the operator to jog the robot to the correct calibration position. This embodiment further facilitates the calibration of the robot cell.

According to an embodiment of the invention, the method comprises automatically generating a step-by-step user interface that shows the images and guides the user trough the calibration process based on said sequence of calibration points, transferring the user interface to the robot, and displaying the user interface during the calibration. According to this embodiment of the invention, images from the off-line programming tool are combined with a step-by-step user interface that presents the images, for example on the Teach Pendant Unit, and guides the user step by step trough the calibration process.

According to an embodiment of the invention, the robot comprises a control unit and a Teach Pendant unit (TPU) having a display device for manually controlling the robot, and said calibration program is transferred to and executed by the control unit and said images are displayed on the display device of the Teach Pendant unit.

According to an embodiment of the invention, the method comprises storing for each of the calibration points the position of the robot when the robot is positioned in the calibration point, and determining for each object in the robot cell the positional relationship between the model of the object and the real object based on the stored robot positions for the calibration points.

According to an embodiment of the invention, each of said images shows information from the calibration program regarding movement of the robot to the next calibration point in the sequence, and each of said images shows user activated means for starting and stopping execution of the calibration program. This embodiment makes it possible for the user to determine whether the calibration program is to be run or not for each calibration point.

According to an embodiment of the invention, each calibration point is provided with an image showing the object to be calibrated and the next calibration point, to which the robot shall be moved according to the sequence of calibration points. In order to provide an accurate calibration of the robot cell it is important that the robot visits the calibration points in the defined order. By displaying the position of the next calibration to the operator, it is ensured that the operator moves the robot to the correct calibration point in the correct sequence of calibration points.

According to an embodiment of the invention, a reference frame is defined in relation to each of the objects and a path including a plurality of target points defined in relation to the reference frames are programmed by means of the off-line programming tool, and the method comprises: storing for each of the calibration points the position of the robot when the robot is positioned in the calibration point, and determining for each object the positional relationship between the reference frame of the model of the object and the reference frame of the real object based on the stored robot positions for the calibration points. The reference frame is a coordinate system that is fixed in relation to the object. The position and orientation of the reference frame is determined by the position and orientation of the object. If there is more than one object in the coordinate system, a reference frame is defined for each object. The reference frames are defined in the common world coordinate system. This embodiment eliminates the need of correcting the programmed positions on the path. All that is needed is to correct the position and orientation of the reference frames of the objects, and the positions on the path will thereby automatically be corrected, since they are programmed in relation to the reference frame instead of in relation to the work coordinate system.

According to another aspect of the invention, this object is achieved by the system as defined herein.

Such a system comprises a computer unit located at the off-line programming site and configured to store a sequence of calibration points for each of the objects, and to generate a sequence of images including graphical representations of the objects to be calibrated and the calibration points in relation to the objects, and to transfer the images to the robot, and that the robot is configured to display said sequence of images to a robot operator during calibration of the robot cell so that for each calibration point a view including the present calibration point and the object to be calibrated is displayed to the robot operator.

The invention provides a system to help the robot operator take an off-line programmed robot program to a robot cell on a factory floor and calibrate the objects in the robot cell. This is accomplished by taking images from the off-line programming tool and to present the images for the operator during the calibration. In addition this is combined with a robot program that is used to quickly move the robot to all of the calibration points.

Further developments of the system are characterized by the features herein.

BRIEF DESCRIPTION OF THE DRAWINGS

The invention will now be explained more closely by the description of different embodiments of the invention and with reference to the appended figures.

FIG. 5 a-c show examples of images displayed at a Teach Pendant unit during calibration.

DETAILED DESCRIPTION OF PREFERRED EMBODIMENTS OF THE INVENTION

Figure 1:
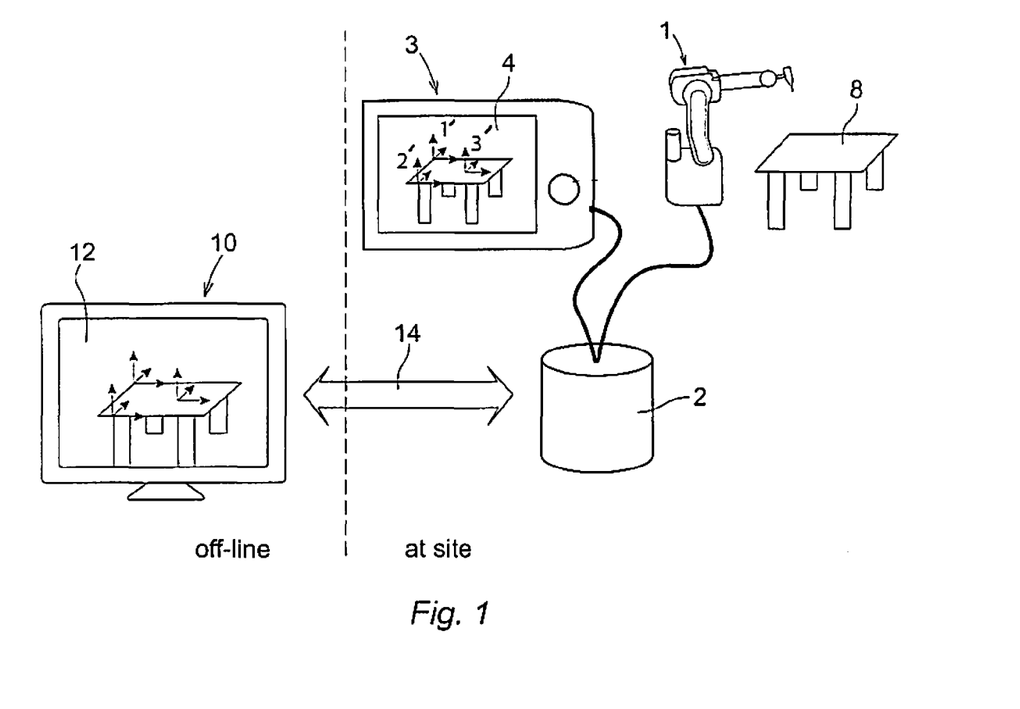
FIG. 1 shows a system for calibration of a robot cell according to an embodiment of the invention.

FIG. 1 shows a robot cell located at site, for example, at a factory. The robot cell includes a manipulator 1, a robot control unit 2 for controlling the movements of the manipulator 1, and a hand held Teach Pendant unit 3 including a display screen 4. The Teach Pendant unit is communicating with the control unit 2 and is used for teaching and programming the robot. The Teach Pendant unit 3 is also provided with means, such as a joy stick or jogging buttons, for manually moving, also denoted jogging, the manipulator 1. The robot cell further includes a object 8, in this example a table. The manipulator 1 is programmed to perform work in connection with the object 8. The control unit 2 is described in more detail with reference to FIG. 3.

FIG. 1 further shows a computer unit 10, for example a personal computer (PC), located at an off-line programming site. The robot cell is programmed at the off-line site by means of the computer unit 10. The computer unit 10 is provided with an off-line programming tool for simulating and programming the movements of the manipulator. Output from the programming tool is robot programs including a plurality of target points. The programming tool included a graphical component for generating 3D graphics based on models of a plurality of different types of objects. The computer unit 10 comprises a graphical displayed screen 12 and user input means (nor shown) for entering data to the computer unit 10. The graphical display screen 12 is, for example a touch screen, which makes it possible for the user to interact with the computer unit via the screen. However, in another embodiment the input means could be a key board and a pointing device. The computer unit 10 includes a plurality of software modules and hardware for executing the software modules. The computer unit 10 will be described in more detail with reference to FIG. 2.

The computer unit 10 and the robot control unit 2 are communicating with each other via a communication link 14. When the robot program has been generated it is transferred to the control unit 2, for example, via the communication link 14. However, before executing the robot program the real robot cell has to be calibrated and the target points of the robot program has to be corrected based on the calibration. The computer unit 10 and the control unit 2 are provided with software modules configured to facilitate the calibration of the work cell, as shown in FIGS. 2 and 3.

The programmer programs the desired path and robot movements using the 3D models of the objects. Many of the paths and target points are associated with objects in the 3D world. Process application movement targets are always associated with 3D objects. Usually the actual positions in the programmed path are related to a reference frame defined in relation to the object. The reference frame is a coordinate system that is fixed in relation to the object. The position and orientation of the reference frame is determined by the position and orientation of the object. If there is more than one object in the coordinate system, a reference frame is defined for each object. The reference frames are defined in the common world coordinate system. Thus, the programmer can move the 3D object and the target points are moved in relation. When the user is done with the 3D modelling, lay-out and has generated a robot program, the time comes to put this on to the real robot.

Figures 2, 3, 6:
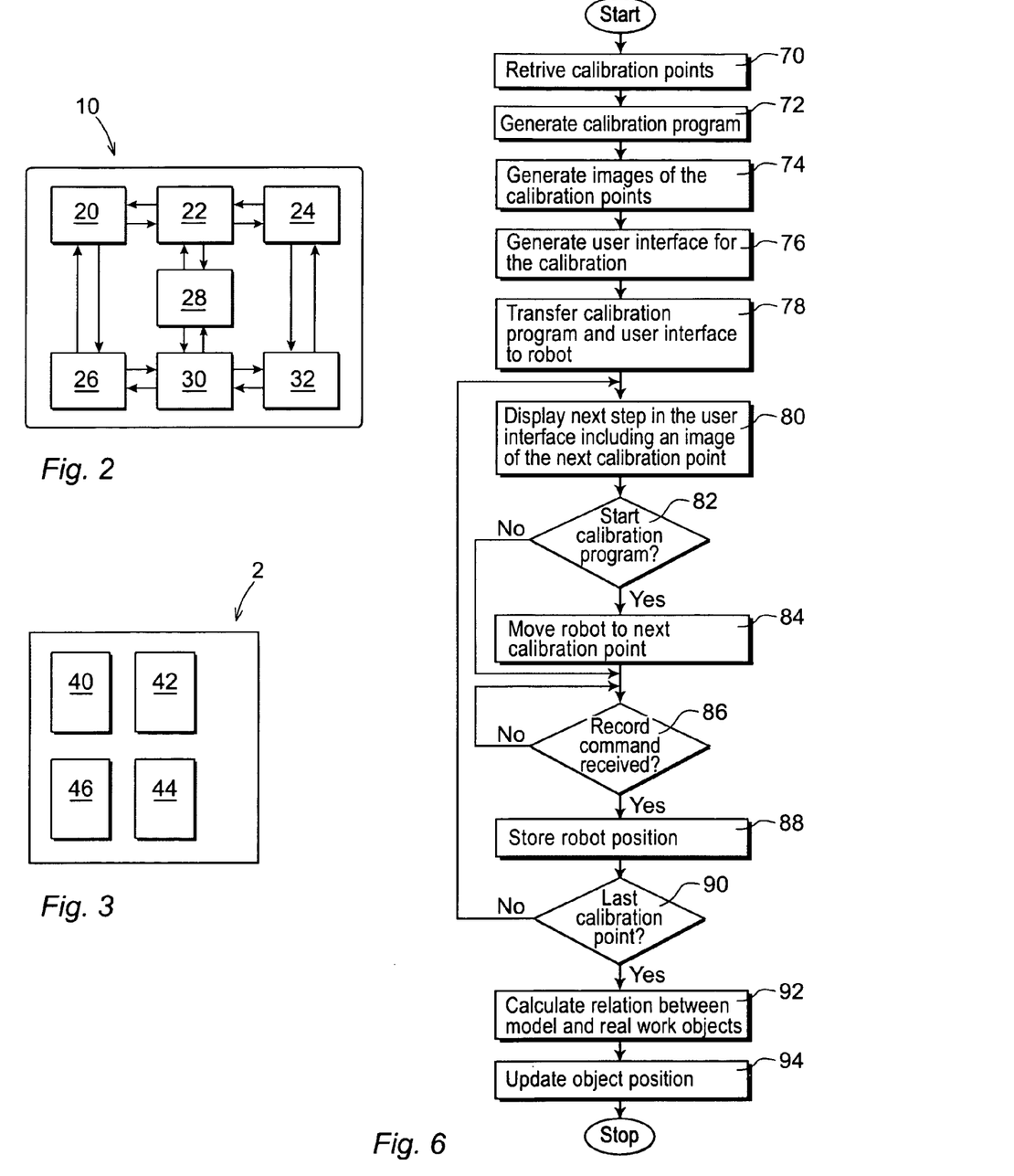
FIG. 2 shows an example of a computer for off-line programming of the robot.
FIG. 3 shows an example of a control unit of an industrial robot.
FIG. 6 shows a flow chart of a method for calibration of a robot cell according to an embodiment of the invention.

FIG. 2 shows a block diagram illustrating an example of a computer unit 10 provided with software modules for facilitating the calibration. The computer unit 10 comprises a memory location 20 for storing graphical models of the objects and predefined calibration points. The memory location 20 may include a library having a set of predefined object types For instance, the predefined object types can be different types of machines, devices for holding an object, work pieces or tools. Each work station type also includes a 3D geometric model of the work station type, or information about how to generate the geometric model of the work station. In this embodiment of the invention, each work station type also includes a sequence of calibration points to be used during calibration of the work station. The number of calibration points for each object must be at least three. However, the number of calibration points can be more than three, for example, typically in the range of 3-10. Preferably, the calibration points are selected to correspond to a well defined structure of the object, such as a corner, a tip, or a protruding part, thereby facilitating for the robot operator to find the position of the calibration point.

Figure 4:
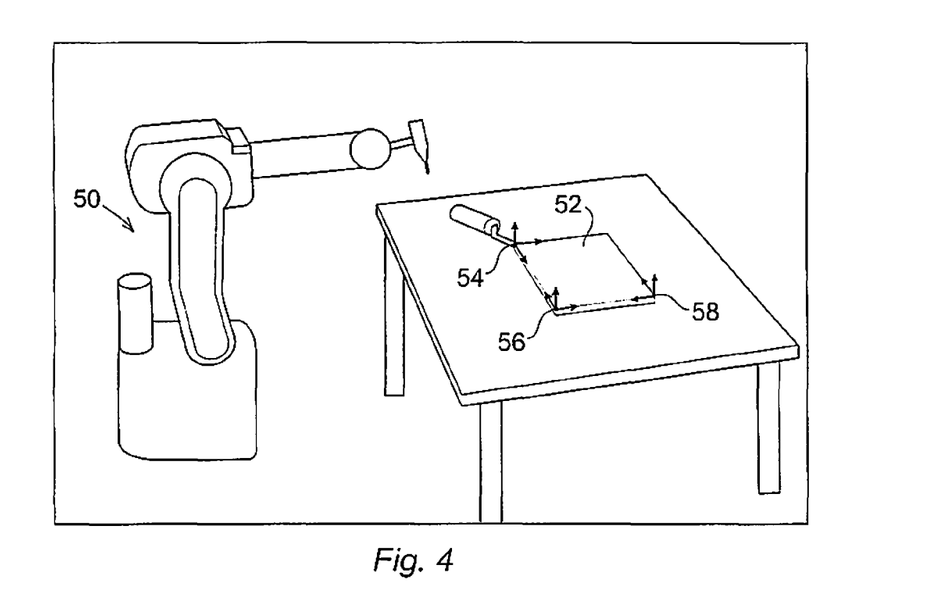
FIG. 4 shows an example of a view of the robot cell displayed on the off-line computer.

The computer unit further comprises a graphical component 22 for generating 3D graphics based on the graphical models of the objects. During programming, the programmer selects one or more work stations from the library of work stations and a graphical representation of the robot cell is built up. FIG. 4 shows an example of a view built up in the off-line programming tool. The view includes graphical representation of the robot 50 and a graphical representation of selected objects 52. This graphical view of the robot cell is used for programming the robot. For example, the programmer may input target points on a desired robot path. A robot program is automatically generated based on the inputs of the programmer and the geometric models of the object in the robot cell.

The computer unit further comprises a robot program generator 24 for generating robot programs for the robot based on the models of the objects and user input on target points. The computer unit comprises a calibration program generator 26 configured to generate one or more calibration programs including instructions for moving the robot to positions at or close to the calibration points based on the sequences of calibration points stored in the memory location 20 and which objects the programmer has selected. Due to the risk for collision, it is to prefer that the robot is moved to a position at a distance from the calibration point and the robot operator manually jog the robot to the correct position of the calibration point.

The computer unit also comprises an image generator 28 and a user interface generator 30. The image generator 28 is configured to generate a sequence of images including graphical representations of the objects selected by the programmer to be included in the work cell, and accordingly to be calibrated, and the positions of the calibration points in relation to the objects. The sequence of the images represents the sequence in which the calibration points should be visited by the robot during the calibration. In order to reduce the risk for the robot operator to visit the calibration points in an erroneous order, it is to prefer that one image is generated for each calibration point. Accordingly, the same number of images is produced as the number of calibration points. The images are generated by means of the graphical components 22 based on the graphical models of the object including the sequences of calibration points stored in memory location 20. Actually, the images are snap-shots from the graphical component 22. The user interface generator 30 is configured to generate a step-by-step user interface that shows the images and guides the user through the calibration process.

The user interface generator 30 produces the user interface by incorporating the sequence of images generated by the imaging generator 28 in a user interface template of a wizard type. In an alternative embodiment, the user interface generator 30 also incorporates program code from the calibration program, generated by the calibration program generator 26, in the user interface together with the images and provides a possibility for the robot operator to start and stop execution of the calibration program from the user interface, and also to provide a possibility for the robot operated to modify the calibration program.

The computer unit 10 is further provided with a communication unit 32 for communicating with the control unit 2 via the communication link 14. The communication unit 32 is configured to transfer robot programs, calibration programs, and user interfaces including images for the calibration to the control unit 2.

FIG. 3 shows a block diagram illustrating the parts of the control unit 2 which are important for the present invention. The control unit 2 includes a communication unit 40 to enable communication with the computer unit 10 via the communication link 14. The control unit 2 is provided with a program executor 42 for executing the robot programs and the calibration programs, and a storage unit 44 for storing the calibration program and robot programs. Accordingly, the calibration programs are run of the control unit 2. The user interface for the calibration is transferred from the control unit 2 to the Teach Pendant unit 3 and is displayed on the display screen 4. In this example, the control unit 2 is provided with a calibration module 46 configured to record the robot positions when the robot is positioned in the calibration points and to determine for each object in the robot cell the positional relationship between the model of the object and the real object based on the recorded robot positions for the calibration points. Further the calibration module is configured to adjust the target points of the robot program based on the determined relationships between the models of the objects and the real object in the robot cell.

FIG. 1 shows an example of a robot cell displayed on the off-line computer unit 10 during programming of the robot. During calibration, the Teach Pendant unit 3 shows a 3D image of the object and sequence of calibration points to be visited during the calibration. An example of such an image displayed on the Teach Pendant unit 3 is shown in FIG. 1. Three calibration points are defined for the object 8. In this example, the image displayed on the Teach Pendant unit 3 shows all three calibration points at the same time and each calibration point is provided with a number 1'-3' defining the order in which the robot shall visit the calibration points.

Figure 5A:
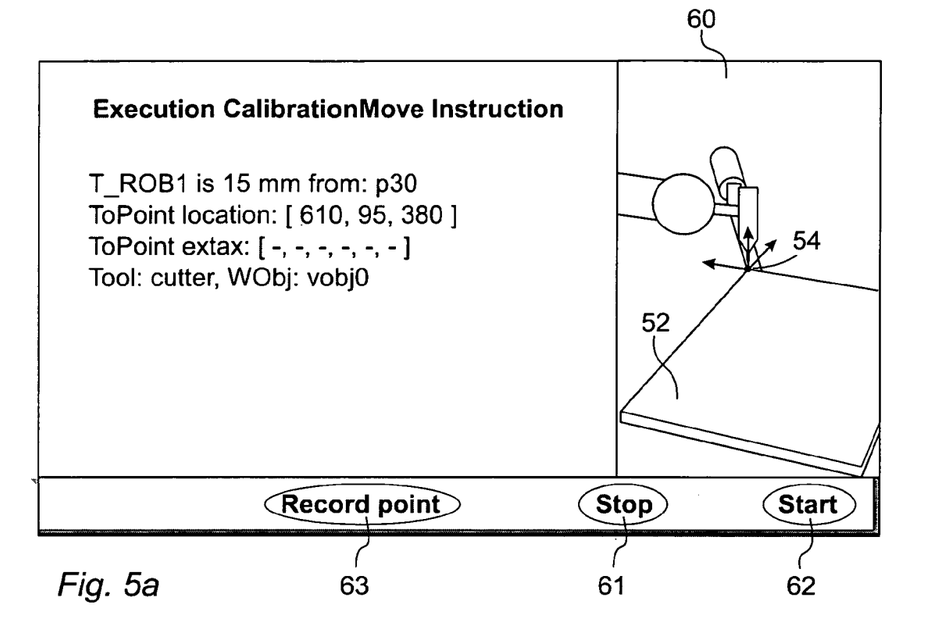
Figure 5B:
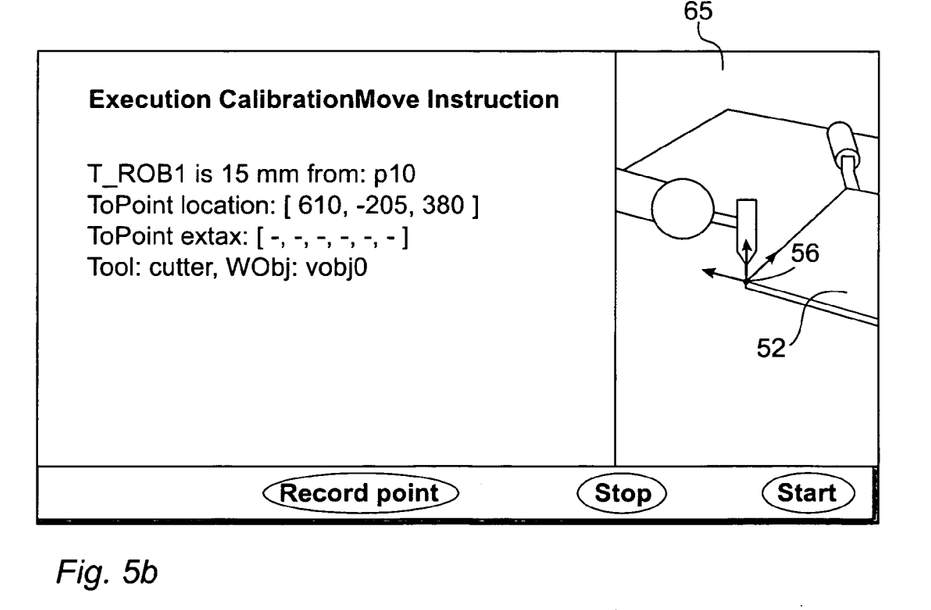
Figure 5C:
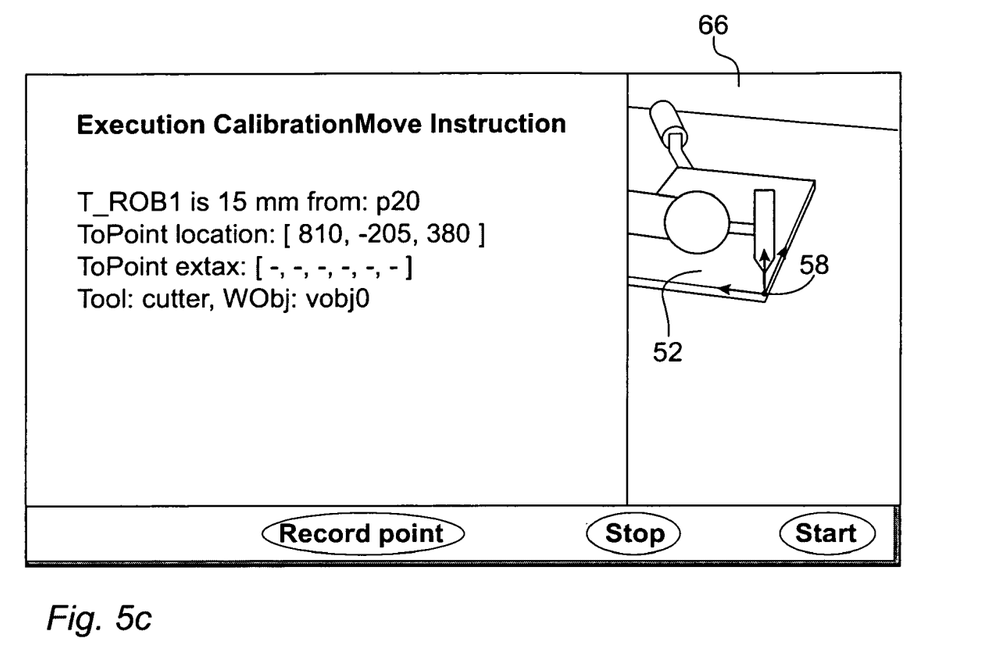

FIG. 4 shows another example of a robot cell displayed on the off-line computer unit 10 during programming of the robot. The figure shows a graphical representation 50 of the robot, a graphical representation 52 of the object. In the example shown in FIG. 4, only one object is to be calibrated. However, other robot cells may include a plurality of objects to be calibrated. In the figure, three calibration points are shown 54,56 and 58. The calibration points have been selected as corners of the object 52 in order to facilitate for the operator to move to the exact position of the calibration points. FIGS. 5*a-c* shows a sequence of images displayed on the Teach Pendant unit 3 during calibration of the object 52.

FIG. 5*a* shows a first view displayed during calibration of the robot cell at the Teach Pendant unit 3. The view displayed on the Teach Pendant unit includes editable program code of the calibration program, including instructions for moving the robot to a position close to the calibration point. Thus, it is possible for the robot operator to edit the program code from the Teach Pendant unit 3. The view further includes an image 60 showing a graphical representation of the object 52, a graphical representation of the first calibration point 54 in the sequence of the calibration points, and a graphical representation of the robot pointing at the calibration point. The view further includes a stop button 61 for stopping execution of the calibration program upon activation of the robot operator, and start button 62 for starting execution of the calibration program upon activation of the robot operator. Further, the view is provided with a record point button 63, which upon activation stores the present position of the robot. This record point button is to be activated by the robot operator when the robot is in the correct calibration position.

FIG. 5*b* shows a second view in the sequence of views displayed during calibration of the robot cell. The second view includes program code of the calibration program for moving the robot to a position close to the second calibration point in the sequence of calibration points, and an image 65 showing the position of the second calibration point 56 in relation to the object 52.

FIG. 5*c* shows a third view in the sequence of views displayed during calibration of the robot cell. This is the last view in the sequence. The view includes program code for moving the robot to a position close to the third calibration point and an image 66 showing the position of the third calibration point 58 in relation to the object 52.

The calibration system according to the invention at least produces the following output: a calibration program and 3D images of the objects and the calibration points. The calibration program contains the robot motion instructions necessary to move the robot to the necessary calibration positions that are needed for calibrating the different objects in the cell. The images to be presented at the Teach Pendant unit are pictures taken from the 3D simulation, which are automatically generated and scaled to fit the screen of the Teach Pendant unit. These pictures show the objects to be calibrated and what points are to be used when jogging the robot and calibrating. According to a preferred embodiment of the invention, a user interface application program is generated. The user interface application program is a .NET assembly that is generated based upon the data in the 3D simulation and which contains a step-by-step user interface that shows the 3D images and guides the user through the calibration process. The user interface application program is run on the Teach Pendant unit. The interface application program is essentially a "wizard" in that it makes the calibration process easy and straight forward.

In an alternative embodiment, the off-line programming tool produces the 3D images and the calibration programs, but the calibration programs contain more code for running the calibration process. Thus, the execution of the guided calibration is run from robot language instructions and not from a Teach Pendant application assembly.

In a further alternative embodiment, the 3D off-line programming tool still generates the calibration programs and 3D images, but the control unit of the robot already contains a calibration engine which receives the images and the calibration program and then the operator starts the calibration engine.

FIG. 6 shows a flow chart illustration of a method according to an embodiment of the present invention. It will be understood that each block of the flow chart can be implemented by computer program instructions. However, some of the steps are executed on the off-line computer unit 10 and some of the steps are executed on the robot control unit 2, and some steps can be executed on the Teach Pendant unit 3. In this embodiment the steps 70-78 are executed on the computer unit 10, the step 80 is executed on the Teach Pendant unit, the steps 82-94 are executed on the robot control unit.

A first, the sequences of calibration points corresponding to the selected objects of the robot cell is retrieved, block 70. The calibration points are retrieved from the memory location 20. Thereafter, one or more calibration programs are generated based on the retrieved sequences of the calibration points, block 72. A sequence of images including graphical views of the objects and the calibration points and are automatically generated by means of the graphical component of the off-line programming tool, block 74. For example, one image is generated for each calibration point. A user interface program for the calibration is automatically generated based on the generated images and the calibration program, block 76. In this embodiment the user interface program is configured to be executed on the Teach Pendant unit and is configured to generate a graphical user interface for interaction with the user during the calibration process. The calibration program and the user interface program including the images are transferred to the robot control unit, block 78. The calibration program is executed on the robot control unit during the calibration and the user interface program is executed on the Teach Pendant unit during the calibration. The robot control unit transfers the user interface program to the Teach Pendant unit.

When the robot operator orders start of calibration, the user interface on the Teach Pendant unit displays the first view, for example the view shown in FIG. 5a, of the sequence, including an image of the first calibration point in relation to the object, block 80. The robot operator starts the calibration program through the displayed user interface by activating the start button in the view, block 82. A start order is sent from the Teach Pendant unit to the robot control unit, which upon receiving the start order start execution of the calibration program and the robot is automatically moved to a position close to the calibration point, block 84. When the robot has been moved to the position close to the calibration point the calibration program is automatically stopped. Now it is up to the robot operator to manually jog the robot to the calibration point. The displayed image of present calibration point and the object provides the operator with information about the location of the calibration point. When the operator has jogged the robot to the exact position of the calibration point, the operator activates the record button on the user interface and a record command is sent to the robot control unit. When the robot control unit receives the record command, block 86 the current position of the robot is stored, block 88. For example, the robot position includes information on joint angles of the axes of the robot.

The steps 82-88 is repeated for each of the calibration points in the sequence. When the robot has visited all calibration points and the positions of the robot are recorded for each calibration point, block 90, it is possible to calculate the relations between the positions of object models and the positions of the real objects, block 92. In this example, the calculation is made in the robot control unit. However, in an alternative embodiment this calculation can be made on a remote computer. The recorded robot positions are used to calculate the actual positions of the real objects. The relation between the models of the objects and the real objects are calculated, for example, by best fit between the position of the calibration points on the models and the positions of the real objects. The real position of the work object is then updated, and accordingly all the position on the programmed path will be updated since the relation between the position on the programmed path and the work object is kept. block 94. When the real position of the work object is updated the reference frame is also updated. Accordingly, it is not necessary to calculate new positions of the path.

The present invention is not limited to the embodiments disclosed but may be varied and modified within the scope of the following claims. For example, the robot cell can include a plurality of objects. Then, the sequence of calibration points depends on a defined order in which the objects are to be calibrated. In this case the user interface is generated based on the defined order in which the objects are to be calibrated. Further, the robot cell can also contain multiple robots.

The invention claimed is:

1. A method for facilitating calibration of a robot cell including one or more objects (8;52) and an industrial robot (1,2,3) performing work in connection to the objects, wherein the robot cell is programmed by an off-line programming tool including a graphical component (22) for generating 2D or 3D graphics based on graphical models of the objects, and the method comprises:

storing for each of the objects a sequence of calibration points (54,56,58) including information on a desired order in which the calibration points should be visited during calibration, automatically generating a sequence of images (60, 65, 66) that shows the order in which the calibration points are to be visited, each of the images including a graphical representation of the object to be calibrated and the calibration point in relation to the object, transferring the sequence of images to the robot, and displaying said sequence of images to a robot operator during calibration of the robot cell so that for each calibration point a view including a present calibration point and the object to be calibrated is displayed to the robot operator.

2. The method according to claim 1, wherein said images are generated by said graphical component of the programming tool.

3. The method according to claim 1, wherein said sequence of calibration points is stored together with the graphical model of the object.

4. The method according to claim 1, wherein the method further comprises:
automatically generating a step-by-step user interface that shows the images and guides a user through the calibration process based on said sequence of calibration points,
transferring the user interface to the robot, and
displaying the user interface during the calibration.

5. The method according to claim 1, wherein the method further comprises: automatically generating at least one calibration program including instructions for moving the robot to positions at or close to the calibration points, based on said stored sequence of calibration points, transferring the calibration program and the images to the robot, and executing said calibration program so that for each calibration point the robot is automatically moved to a position at or close to the calibration point.

6. The method according to claim 5, wherein the robot comprises a control unit and a Teach Pendant Unit (TPU) for manually controlling the robot and having a display screen, and said calibration program is transferred to and executed by the control unit and said images are displayed on the display screen of the Teach Pendant unit.

7. The method according to claim 5, wherein each of said images shows information from the calibration program regarding movement of the robot to a next calibration point in the sequence, and each of said images shows user activated means for starting and stopping execution of the calibration program.

8. The method according to claim 1, wherein a reference frame is defined in relation to each of the objects and a path including a plurality of target points defined in relation to the reference frames is programmed by the off-line programming tool, and the method further comprises: storing for each of the calibration points the position of the robot when the robot is positioned in the calibration point, and determining for each object the positional relationship between the reference frame of the model of the object and the reference frame of the real object based on the stored robot positions for the calibration points.

9. The method according to claim 1, wherein each calibration point is provided with an image showing the object to be calibrated and a next calibration point, to which the robot shall be moved according to the sequence of calibration points.

10. A system for facilitating calibration of a robot cell including one or more objects (8;52) and an industrial robot (1,2,3) performing work in connection to the objects, wherein
the robot cell is programmed by an off-line programming tool including a graphical component (22) for generating 2D or 3D graphics based on graphical models of the objects, and the system comprises
a computer unit (10) located at the off-line programming site and configured to store for each of the objects a sequence of calibration points (54,56,58) including information on a desired order in which the calibration points should be visited during calibration, and to generate a sequence of images (60,65,66) that shows the order in which the calibration points are to be visited, each of the images including a graphical representation of the object to be calibrated and the calibration point in relation to the object, and to transfer the images to the robot, and the robot is configured to display said sequence of images to a robot operator during calibration of the robot cell so that for each calibration point a view including a present calibration point and the object to be calibrated is displayed to the robot operator.

11. The system according to claim 10, wherein the system further comprises the computer unit (10) configured to generate said images by said graphical component.

12. The system according to claim 10, wherein the system further comprises said computer unit (10) configured to store said sequence of calibration points together with the graphical model of the object.

13. The system according to claim 10, wherein the system further comprises the computer unit (10) configured to generate at least one calibration program including instructions for moving the robot to positions at or close to the calibration points, based on said stored sequence of calibration points, and to transfer the generated calibration program to the robot, and the robot is configured to execute said calibration program during calibration of the robot cell so that for each calibration point the robot is automatically moved to a position at or close to the calibration point.

14. The system according to claim 13, wherein the system further comprises the robot comprising a control unit (2) and a Teach Pendant unit (3) for manually controlling the robot and having a display screen (4), and said calibration program transferred to and executed by the control unit and said images are displayed on the display screen of the Teach Pendant unit.

15. The system according to claim 10, wherein the system further comprises a reference frame is defined in relation to each of the objects and a path including a plurality of target points defined in relation to the reference frames programmed by the off-line programming tool, and the robot is configured to receive information on when the robot is positioned in the calibration point, and to store the position of the robot upon receiving this information, and the robot comprises computing means (46) for determining the positional relationship between the reference frame of the model of the object and the reference frame of the real object based on the stored robot positions for the calibration points.

16. The system according to claim 10, wherein the system further comprises said computer unit (10) configured to generate a step-by-step user interface that shows the images and guides a user through the calibration process based on said sequence of calibration points, and to transfer the user interface to the robot, and the robot configured to display the user interface during the calibration.

17. The system according to claim 11, wherein the system further comprises said computer unit (10) configured to store said sequence of calibration points together with the graphical model of the object.

18. The system according to claim 17, wherein the system further comprises the computer unit (10) configured to generate at least one calibration program including instructions for moving the robot to positions at or close to the calibration points, based on said stored sequence of calibration points, and to transfer the generated calibration program to the robot, and the robot configured to execute said calibration program during calibration of the robot cell so that for each calibration point the robot is automatically moved to a position at or close to the calibration point.

19. The system according to claim 11, wherein the system further comprises the computer unit (10) configured to generate at least one calibration program including instructions for moving the robot to positions at or close to the calibration points, based on said stored sequence of calibration points, and to transfer the generated calibration program to the robot, and the robot configured to execute said calibration program during calibration of the robot cell so that for each calibration point the robot is automatically moved to a position at or close to the calibration point.

20. The system according to claim 12, wherein the system further comprises the computer unit (10) configured to generate at least one calibration program including instructions for moving the robot to positions at or close to the calibration points, based on said stored sequence of calibration points, and to transfer the generated calibration program to the robot, and the robot configured to execute said calibration program during calibration of the robot cell so that for each calibration point the robot is automatically moved to a position at or close to the calibration point.

* * * * *